2 Sheets--Sheet 1.

J. J. & J. P. MAYBERY.
Methods of Ornamenting Walls.

No. 152,664. Patented June 30, 1874.

2 Sheets--Sheet 2.

J. J. & J. P. MAYBERY.
Methods of Ornamenting Walls.

No. 152,664. Patented June 30, 1874.

John J. Maybery
James P. Maybery
By Knight Bros.
Att'ys.

Attest.
Jas. H. Layman.
Walter Allen

UNITED STATES PATENT OFFICE.

JOHN J. MAYBERY AND JAMES P. MAYBERY, OF CINCINNATI, OHIO.

IMPROVEMENT IN THE METHODS OF ORNAMENTING WALLS.

Specification forming part of Letters Patent No. 152,664, dated June 30, 1874; application filed August 19, 1873.

*To all whom it may concern:*

Be it known that we, JOHN J. MAYBERY and JAMES P. MAYBERY, of Cincinnati, Hamilton county, Ohio, have invented a new and useful Improvement in Wall-Paper, of which the following is a specification:

Our invention is an improvement on those wall-papers which are designed to simulate paneled wainscotings; and consists in the provision for any particular pattern of distinct sets of "running panel" work and "headings," any two of which may be combined in one wainscot, according to the taste of the proprietor, and with any desired number of equidistant and equal or alternately unequal panels, whatever be the size of the apartment, thus combining variety, beauty, and accuracy of finish, with an important saving in material and labor.

Figure 1:
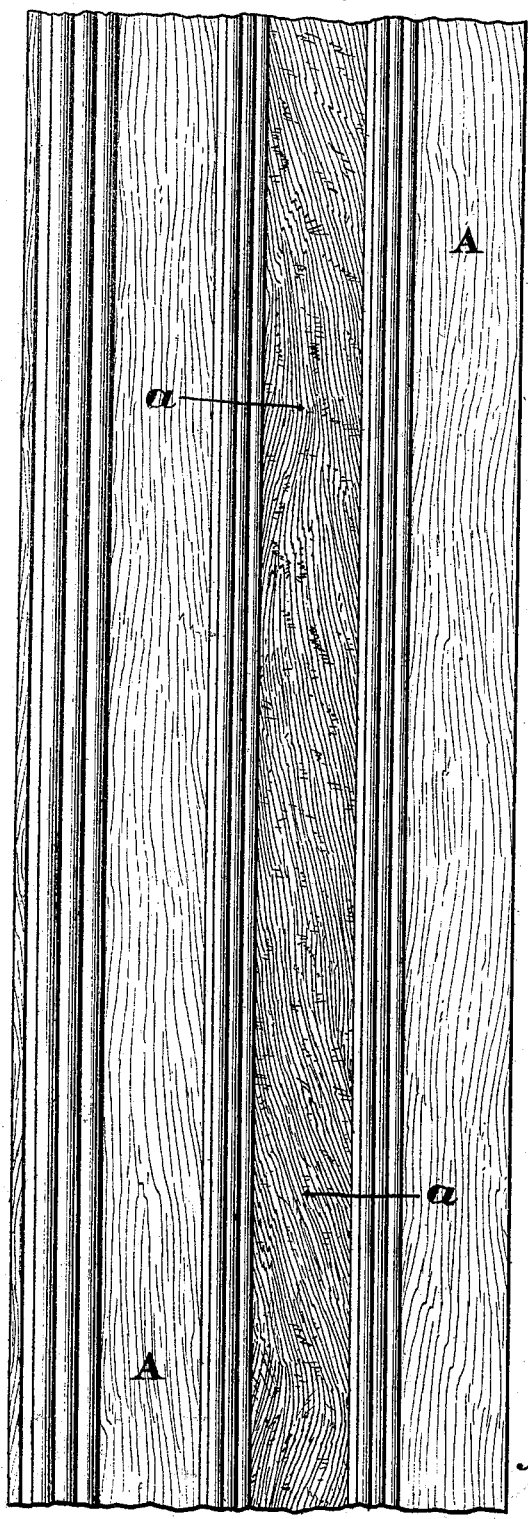
Figure 2:
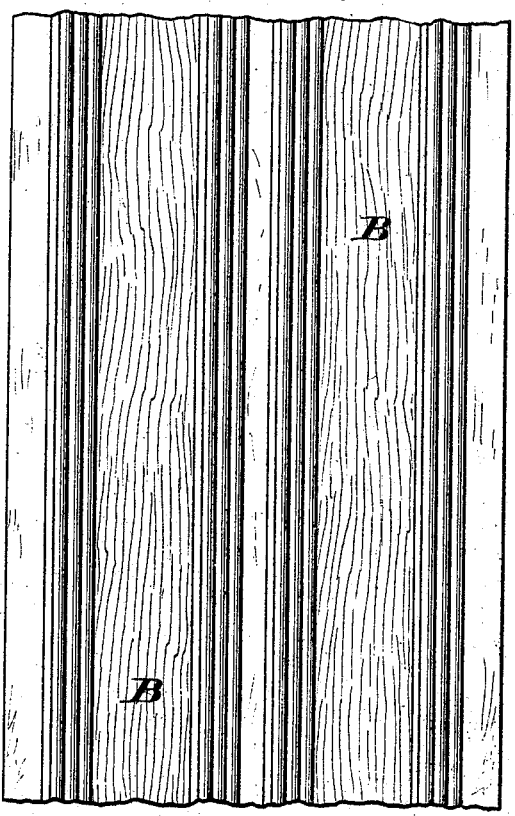
Figure 3:
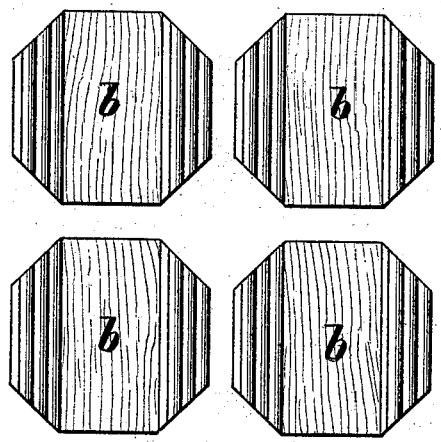
Figure 4:
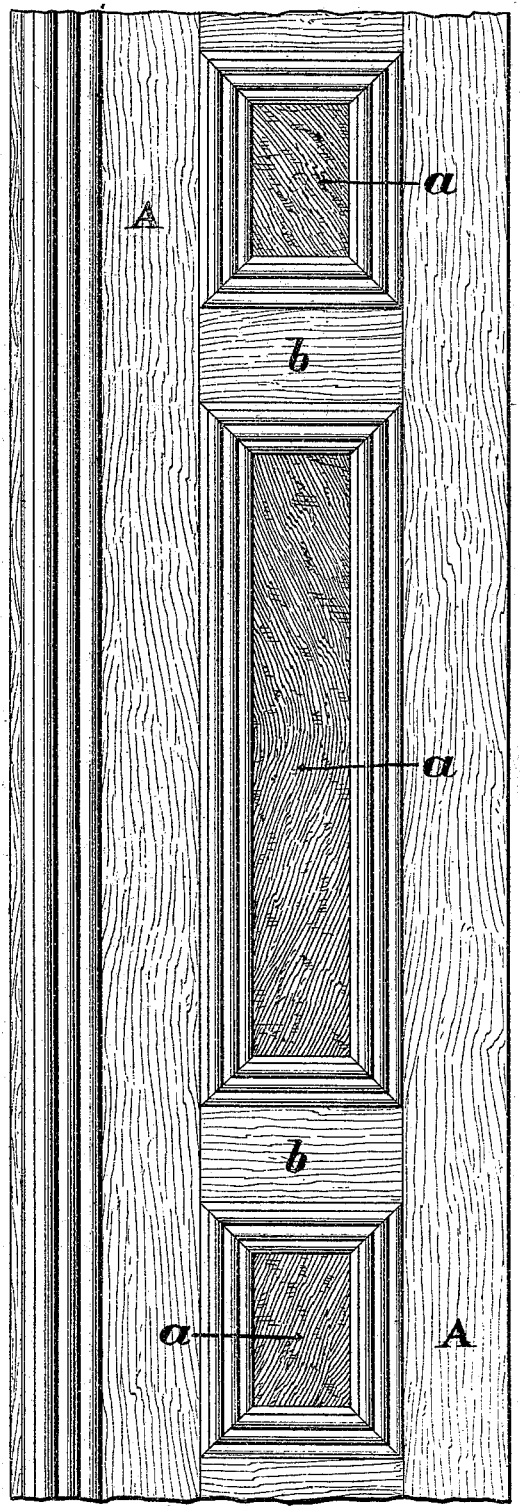
Figure 5:
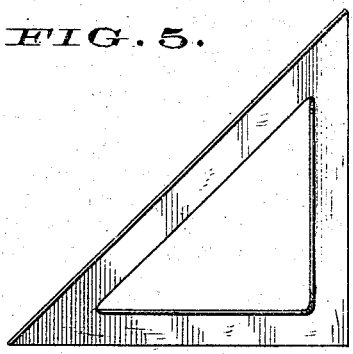

Figure 1 is a face view of a fragment of our body-paper, containing running panel or panels, moldings, &c. Fig. 2 is a similar view of a fragment of our heading-sheet, containing two heading-strips intended to be cut apart for use, portions of the same being shown in Fig. 3 separated for headings. Fig. 4 represents a fragment of body-paper laid off in desired panels by headings pasted thereupon. Fig. 5 represents a tram suitable for cutting the mitered ends of our headings.

Our body-paper, A, Fig. 1, differs from the common wainscot or panel wall-paper in the panel-work, being printed continuously or without breaks or headings, which, by our arrangement, are printed upon a distinct and separate sheet, B, Fig. 2, and the headings *b*, being cut therefrom, are pasted upon the body-sheet either before or after its attachment to the wall. (See Fig. 3.) By this means the panels *a* can be adjusted as to size so as to fit any room, hall, or apartment without the customary unsightly effect of an odd or unequal panel at one end of the sheet, which, as is well known, entirely destroys the illusory and otherwise pleasing effect, particularly in a rich and ornate pattern.

For cutting the ends of the headings any simple form of tram or miter, such, for example, as shown in Fig. 5, may be employed.

The heading-pattern might be, of course, printed on the upper or under side of the body-pattern; but we prefer to print them on separate sheets, because many variable relative quantities will be used, and where printed separately the buyer is not obliged to purchase more of either than he needs for any particular job.

An obvious advantage of our invention is, that other headings can be combined with other pattern of panel, or two strongly contrasted panels employed alternately in one wainscot, and without departing from the spirit of my invention, with very striking effect, and at a comparatively nominal outlay.

We claim as an improvement in wall-papers—

The method of ornamenting walls in imitation of panel-work or wainscoting by means of wall-paper consisting of two parts, namely, a body part, A, and a heading, B, each provided with a continuous running pattern representing molding, substantially as shown, and adapted to be divided into panels of any desired length, at the will of the operator, by octagonal overlying pieces *b*, cut from the heading B, all as hereinbefore described, and for the purpose set forth.

In testimony of which invention, we hereunto set our hands.

JOHN J. MAYBERY.
JAMES P. MAYBERY.

Attest:
GEO. H. KNIGHT,
H. SCHOONMAKER.